3,748,315
HEAT RESISTANT URETHANE COATINGS

George Sidney Wooster, Hamburg, and Voldemar Kirss, Buffalo, N.Y., assignors to Allied Chemical Corporation, New York, N.Y.
No Drawing. Filed July 6, 1971, Ser. No. 159,855
Int. Cl. C08g 22/24, 22/32
U.S. Cl. 260—75 NT        8 Claims

ABSTRACT OF THE DISCLOSURE

Urethane coatings can be prepared from blocked prepolymers of tris(2 - hydroxyethyl)isocyanurate and 4,4'-methylenebis(cyclohexylisocyanate) reacted with hydroxyl terminated polyol esters or polyol amines. The stable urethane coating solutions are applied to metal substrates and cured at elevated temperatures to form continuous temperature resistant coatings.

---

This invention relates to urethane coatings of improved thermal stability. More particularly, this invention relates to heat resistant urethane coatings of tris(2-hydroxyethyl) isocyanurate and 4,4' - methylenebis(cyclohexylisocyanate).

BACKGROUND OF THE INVENTION

Urethane films and coatings are well known and are prepared by reacting polyhydric alcohols and aromatic polyisocyanates, preferably in solution. Since reaction between polyhydric alcohols and polyisocyanates is very rapid, generally the polyisocyanate is at least partially reacted with a blocking agent, which prevents reaction of the isocyanate groups with the polyol until thermally activated. This blocking of the isocyanate groups enables solutions of the reactants to be stored until ready for use. After applying to a substrate, the coating is cured by heating, thereby unblocking and regenerating the polyisocyanate groups which can then react with the hydroxy groups present to form a urethane. The blocking agent volatilizes along with the solvent.

Conventional urethane coatings are sensitive to heat, however, and may deteriorate on extended exposure to elevated temperatures, thereby limiting their usefulness. Urethane coatings with improved heat resistance have been disclosed by Cordier in U.S. Pat. 3,174,950 which are derived from tris-(2-hydroxyethyl)isocyanurate and an aromatic diisocyanate, diphenyl methane diisocyanate. However, these coatings deteriorate at temperatures above about 175° C. and the search for urethane coatings useful at temperatures higher than 175° C. has continued.

SUMMARY OF THE INVENTION

We have discovered that urethane coatings prepared from tris(2 - hydroxyethyl)isocyanurate and a cycloaliphatic diisocyanate, 4,4'-methylenebis(cyclohexylisocyanate) have surprisingly high thermal stability and can withstand prolonged exposure to temperatures above 175° C.

DETAILED DESCRIPTION OF THE INVENTION

The present coating compositions are derived from blocked prepolymers of tris(2-hydroxyethyl)isocyanurate and 4,4'-methylenebis(cyclohexylisocyanate) reacted with an hydroxy terminated polyester polyol and/or amine polyol.

The urethane coatings of the invention are prepared in three stages. In the first stage, 4,4'-methylenebis(cyclohexylisocyanate) and tris(2 - hydroxyethyl)isocyanurate are reacted in solution to form a urethane prepolymer having residual NCO groups. Generally, amounts are employed such that the NCO:OH equivalent ratio of the reactants is from about 1.5 to 2.5.

Solvents suitable for employment at this stage are limited to highly polar solvents which are solvents both for tris(1-hydroxyethyl)isocyanurate and the prepolymer. Suitable solvents include formamide, the dialkyl formamides, such as dimethylformamide, diethylformamide and the like, N-alkyl morpholine, dimethylsulfoxide, diethyl carbamate, cyclohexanone and the like. Generally, sufficient solvent is added so that the prepolymer solution contains from 40 to 60 percent by weight of the prepolymer.

Temperatures of reaction suitable for formation of the prepolymer are from 120 to 130° C.

In the second stage the prepolymer, which contains an excess of NCO groups, is treated with a blocking agent to prevent further reaction of the residual NCO groups until they are thermally activated. Blocking agents for isocyanates are well known. Suitable blocking agents react with the NCO groups but split off at elevated temperatures of reaction or cure and volatilize. Suitable blocking agents include monohydric phenols, substituted phenols, xylenols, alcohols, hydroxyalkylcarbamic acid aryl esters, mercaptans, lactams, imides, secondary amines and the like. The cresols are readily available, particularly mixtures of cresols, such as cresylic acid. The latter is a commonly available mixture of ortho-, meta-, and para-cresols having a boiling point in the range between 185°–230° C.

An excess of the blocking agent is employed to ensure reaction with all of the residual NCO groups. Generally sufficient blocking agent will be added to provide an OH equivalent to NCO equivalent ratio of about 2:1 to about 10:1.

The blocking reaction can be carried out at improved rates in the presence of a suitable catalyst, such as an organotin compound. These catalysts are well known and include dibutyltindilauraate, tributyltin octanoate, bis(2-ethylenehexyl)tin oxide, dibutyltin dichloride, tin hexanoate, stannous octanoate and the like. Catalytic amounts of from 0.01 to 0.1 percent by weight of the prepolymer are generally employed. The temperatures of reaction are similar to those of the first stage reaction, in the range between about 120 to about 125° C.

After reaction so that no residual NCO groups are present, the excess blocking agent can be removed, as by washing, or can be allowed to remain as a constituent in the solvent system of the coating.

In the final stage, a hydroxy terminated polyester polyol and/or an amine polyol additive is added to the blocked prepolymer in an amount sufficient to react with the residual NCO groups of the prepolymer when unblocked. The amount of hydroxy additive is not critical and can be a stoichiometric amount, ±about 20 percent by weight of the stoichiometric amount.

Hydroxy terminated polyol polyester compositions are well known for the preparation of urethane coatings and can be branched, low molecular weight polyol polyesters having hydroxyl numbers of from about 100 to 300 and acid numbers of 10 or less. The polyesters are prepared from aliphatic or aromatic dicarboxylic acids and mixed diols and triols. Suitable polyol polyesters are commercially available as "Multron" polyesters, trademark of the Mobay Chemical Company. Blends of such polyesters also can be employed.

Other suitable hydroxy compounds include caprolactone polyester polyols of the general formula

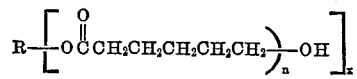

wherein R represents a hydrocarbon, $n$ is an integer from 2 to 10 and $x$ is an integer of 2 or 3. These polyester polyols are available commercially from Union Carbide Corporation under the trademark Niax.

Hydroxy terminated amine polyols can also be added to the blocked prepolymer, either in addition to a polyol polyester or as the sole hydroxy terminated additive. Thus, the polyester polyol to amine polyol ratio in the hydroxy terminated additive can range from 100 percent to 0 percent by weight of each. Suitable amine polyols include monomeric or polymeric amines having an amine equivalent of at least 50 and a boiling point of at least about 190° C.

The hydroxy terminated polyester polyol or amine polyol additive can be conveniently added to the blocked prepolymer solution in a solvent which will dissolve the additive and is also miscible with the prepolymer solution. Suitable solvents include those which can be employed in preparing the blocked prepolymer solution, or solvents such as N-methyl pyrrolidone and the like.

The urethane coating solution prepared as above is ready for use or can be adjusted to the desired consistency by further addition of solvent. Conventional additives such as pigments and colors can also be added if desired. The solutions are stable and can be applied immediately or can be stored until required.

The urethane coating solutions of the invention are applied in conventional manner to metallic substrates, such as by dipping, brushing, spraying and the like. The coatings are then cured by heating at temperatures of from about 150° to 240° C., preferably from about 180° to 200° C. The time required to cure the coatings of the invention will vary somewhat depending upon the temperature of cure, but, in general, will be from at least about 5 minutes up to an hour or more at lower temperatures. During cure, the blocking agent is removed and volatilized along with the solvent and reaction between the unblocked NCO groups and the hydroxy terminated polyester polyol or amine polyol additive proceeds, forming continuous, clear, hard, tough, adherent, flexible heat resistant coatings.

The invention will be further illustrated by the following examples, but it is to be understood that the invention is not meant to be limited to the details described therein. In the examples all parts and percentages are by weight, unless otherwise noted.

EXAMPLE 1

Part A.—Preparation of prepolymer

To a clear solution of 87.0 parts of tris(2-hydroxyethyl)isocyanurate in 349 parts of dimethylacetamide was added 262 parts of 4,4'-methylenebis(cyclohexylisocyanate). The mixture was heated to 120° C. over about 35 minutes and maintained at 120° to 125° C. for 2½ hours. The product was cooled to room temperature. It had an NCO/OH ratio of 2:1 and amine equivalent of 743.

Part B.—Preparation of blocked prepolymer 312.1 parts of the prepolymer of Part A was reacted with 226.8 parts of cresylic acid in the presence of 0.1 part of dibutyltindilaurate catalyst for two hours at 120° to 125° C. When cooled to room temperature the product had a Gardner color of 18, Gardner viscosity of $Z_4+$ and specific gravity of 1.054. The NCO:OH ratio was 1:5. No free NCO was detected by infrared analysis (4.45 mµ).

Part C.—Preparation of coating

To a clear solution of 23.5 parts of an aromatic polyester having a hydroxyl equivalent weight of 376 sold as "Multron" R-38 polyester by Mobay Chemical Company in 73.4 parts of N-methyl pyrrolidone was added 80 parts of the blocked prepolymer of Part B. The resultant urethane coating solution had a Gardner viscosity of E. The NCO:OH ratio was 1:1.

EXAMPLE 2

The procedure of Example 1, Part A was followed except substituting toluene diisocyanate for the diisocyanate reactant. The product gelled.

EXAMPLE 3

This example describes the preparation of a prepolymer of toluene diisocyanate and trimethylolpropane.

Part A

A solution of 76.0 parts of trimethylolpropane in 211 parts of Cellosolve acetate was added to 295.8 parts of toluene diisocyanate. An additional 37 parts of Cellosolve acetate was added and the mixture held at 80° to 85° C. for four hours. When cooled to room temperature the product had an NCO:OH ratio of 2:1 and amine equivalent of 374.

Part B 261.8 parts of the prepolymer of Part A was reacted with 378 parts of cresylic acid in the presence of 0.125 parts of dibutyltindilaurate catalyst for 2 hours at 120° to 125° C. When cooled to room temperature the product had a Gardner color of 18, Gardner viscosity of V, and specific gravity of 1.099. The NCO:OH ratio was 1:5. No free NCO was detected by infrared analysis.

Part C

To a solution of 37.6 parts of Multron R-38 polyester in 107.4 parts of N-methyl pyrrolidone was added 91.4 parts of the blocked prepolymer of Part B. The resultant enamel coating solution had a Gardner viscosity of D. The NCO:OH ratio was 1:1.

EXAMPLE 4

The coating solutions prepared as in Examples 1 and 3 were applied as a 3 mil film on aluminum test panels and cured at 190° C. Film hardness was about the same as shown by the following Sward Rocker hardness results for varying cure cycles:

| Film | Cure time, minutes | | |
|---|---|---|---|
| | 15 | 30 | 60 |
| Example 1 | 62 | 64 | 62 |
| Example 3 | 58 | 58 | 64 |

Direct (D) and reverse (R) impact was determined using a Gardner tester at 160 in./lbs. Results are tabulated below wherein P denotes pass and F denotes fail.

| | Cure time, minutes | | | | | |
|---|---|---|---|---|---|---|
| | 15 | | 30 | | 60 | |
| | D | R | D | R | D | R |
| Example 1 | P | P | P | P | P | P |
| Example 3 | P | P | P | P | F | F |

These results show that long term exposure to elevated temperatures result in embrittlement of the control film with no adverse effect on the film of the invention.

This conclusion was also borne out by flexibility test results which also show embrittlement of the control film after long term exposure at elevated temperatures. The coated test panels were bent back on themselves, stretching the coating. The coating on the panel cured for 60 minutes coated with the composition of Example 3 cracked, whereas the other coatings did not.

EXAMPLE 5

Several 2.5 part portions of the coating solutions of Examples 1 and 3 were poured into tared aluminum dishes, cured at 190° C. for one hour, weighed and placed in a hot air oven at 180° C. to 185° C. Percent weight loss is tabulated below:

| Example | 1 | 3 |
|---|---|---|
| Time: | | |
| 1 week | 9.5 | 21.2 |
| 2 weeks | 11.9 | 24.0 |
| 3 weeks | 13.2 | 24.1 |
| 4 weeks | 14.5 | 25.0 |

This data shows that the coatings of the invention are highly resistant to thermal degradation.

EXAMPLE 6

To a solution of 128.0 parts of the blocked prepolymer prepared in Example 1, Parts A and B in 92.3 parts of N-methyl pyrrolidone were admixed 26.7 parts of an aliphatic polyester having the general formula:

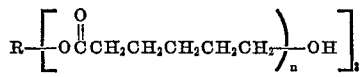

wherein R is a hydrocarbon group and $n$ is an integer, having a hydroxyl number of 211 and hydroxy equivalent weight of 267, acid number of 0.3 and melting point range of 20–25° C. available as Niax D–601 from Union Carbide Corporation. The resultant enamel coating solution had a Gardner viscosity of B and an NCO:OH ratio of 1:1.

A control coating solution was prepared by admixing a solution containing 109.7 parts of the blocked prepolymer prepared in Example 3, Parts A and B in 98.2 parts of N-methyl pyrrolidone with 32.0 parts of the polyester as above. The resultant solution had a Gardner viscosity of A and an NCO:OH ratio of 1:1.

EXAMPLE 7

Percent weight loss of the coating solutions prepared as in Example 6 were determined as in Example 5. Results are tabulated below:

| Time | Example 6 | Example 6, control |
|---|---|---|
| 1 week | 9.2 | 10.9 |
| 2 weeks | 17.5 | 20.2 |
| 3 weeks | 23.1 | 27.0 |
| 4 weeks | 26.5 | 35.5 |

EXAMPLE 8

Test panels were coated and cured with the urethane coating solutions of Example 6 as in Example 4 and exposed in a weatherometer for 200 hours. Gloss values for different cure cycles are summarized below:

| 20° gloss values | Cure time | |
|---|---|---|
| | 30 min. | 60 min. |
| Example 6 | 100 | 87 |
| Example 6, control | 64 | 61 |

This data shows that the coatings of the invention have improved resistance to long-term effects of moisture, oxidation and light.

We claim:

1. A urethane coating composition comprising a mixture of (A) a urethane prepolymer of an NCO blocked reaction product of 4,4'-methylenebis(cyclohexylisocyanate) and tris(2-hydroxyethyl)isocyanurate reacted at 120° to 130° C. in a solvent such that the equivalent ratio of NCO:OH groups is from about 1.5 to 2.5; (B) a hydroxy terminated additive selected from the group consisting of aromatic polyester polyols and polycaprolactone polyols in amount sufficient to provide OH groups to react with the residual NCO groups in the prepolymer when unblocked and (C) a solvent.

2. A coating solution according to claim 1 wherein the prepolymer is blocked with cresylic acid.

3. A reaction product obtained by heating the mixture of claim 1 at temperatures between 150° to 240° C. for at least about 5 minutes.

4. A product according to claim 3 wherein the mixture is heated at temperatures between 180° to 200° C. for from 5 to 60 minutes.

5. A film of the product of claim 3.

6. A film of the product of claim 4.

7. A metal substrate coated with a film of claim 5.

8. A metal substrate coated with a film of claim 6.

References Cited

UNITED STATES PATENTS

| 3,174,950 | 3/1965 | Cordier | 260—77.5 |
| 3,625,921 | 12/1971 | Wooster et al. | 260—77.5 |
| 3,554,962 | 1/1971 | Fischer | 260—45.8 |
| 3,583,943 | 6/1971 | Weber et al. | 260—75 |

OTHER REFERENCES

Union Carbide Corp. Bulletin F–41746: "Niax" Caprolactone Polyols, New York, 1967, pp. 1–4.

DONALD E. CZAJA, Primary Examiner

H. S. COCKERAM, Assistant Examiner

U.S. Cl. X.R.

260—30.2, 30.4, 30.8, 31.2, 32.6, 32.8, 77.5 AN, 77.5 NC, 77.5 TB; 117—132, 161